Figure 1:
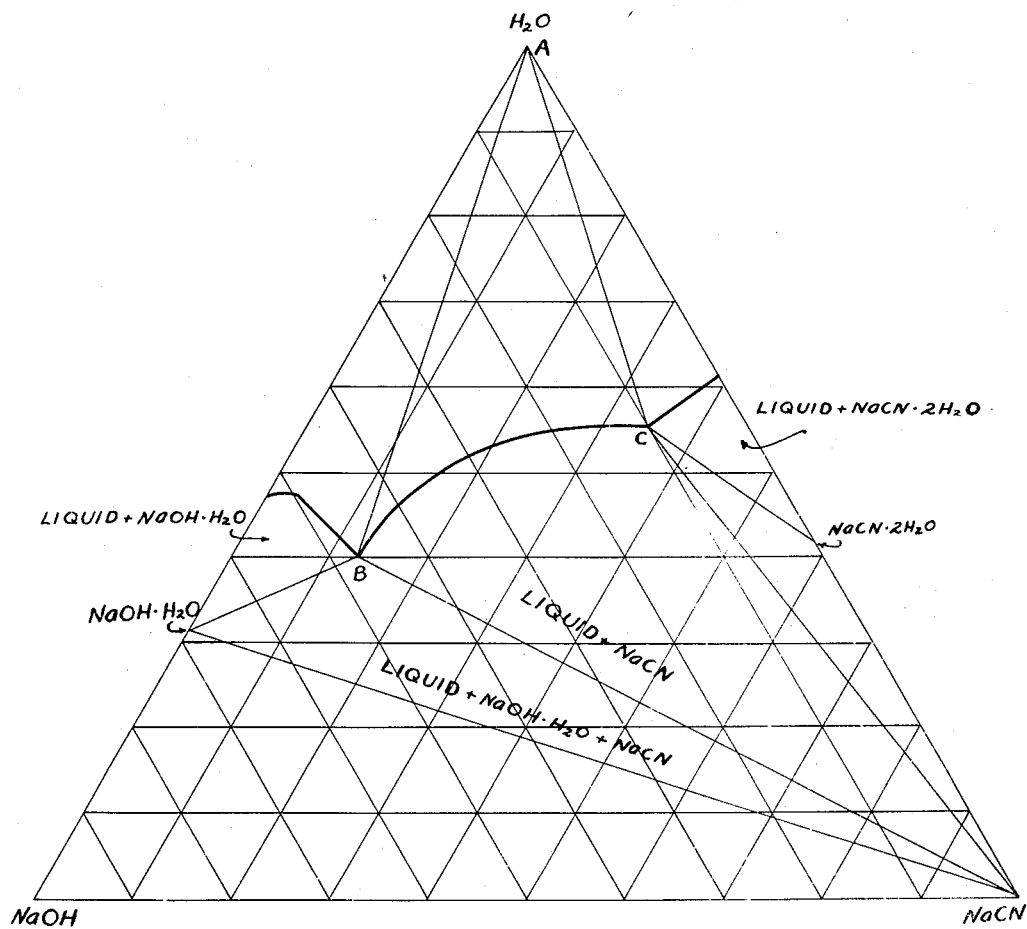

Dec. 6, 1955  G. D. OLIVER  2,726,139
PRODUCTION OF ANHYDROUS SODIUM CYANIDE
Filed May 25, 1953  4 Sheets-Sheet 1

25°C. ISOTHERM FOR SYSTEM
NaCN - NaOH - H₂O

INVENTOR
GEORGE D. OLIVER
BY
ATTORNEY

35°C. ISOTHERM FOR SYSTEM
NaCN – NaOH – H₂O

55°C. ISOTHERM FOR SYSTEM
NaCN - NaOH - $H_2O$

Dec. 6, 1955 G. D. OLIVER 2,726,139
PRODUCTION OF ANHYDROUS SODIUM CYANIDE
Filed May 25, 1953 4 Sheets-Sheet 4

INVENTOR

GEORGE D. OLIVER

BY

ATTORNEY

United States Patent Office 2,726,139
Patented Dec. 6, 1955

2,726,139

PRODUCTION OF ANHYDROUS SODIUM CYANIDE

George D. Oliver, Texas City, Tex., assignor to Monsanto Chemical Company, St. Louis, Mo., a corporation of Delaware Application May 25, 1953, Serial No. 357,067

4 Claims. (Cl. 23—79)

This invention relates to the production of anhydrous sodium cyanide and more particularly to the production of anhydrous sodium cyanide in a substantially pure state by the direct neutralization of sodium hydroxide with hydrogen cyanide gas.

The majority of the prior art processes for producing sodium cyanide via neutralization of sodium hydroxide with hydrogen cyanide gas are batch operations which are characterized by certain disadvantages. The product of the known processes, even after subjection to a relatively expensive purification treatment, is ordinarily in a more or less impure state. Polymerization of hydrogen cyanide during neutralization and partial decomposition of the cyanide during evaporation result in discoloration and degradation in quality of the final product. In addition, the loss of cyanide values is significant. One expedient commonly employed to avoid the mentioned difficulties is the production of a reaction solution containing a substantial amount of sodium hydroxide but where this practice is resorted to the purity of the sodium cyanide product does not generally exceed 90%. Another suggested expedient involves added process steps to remove impurities and recovery of the cyanide product as the dihydrate which must then be converted into the anhydrous form for the commercial trade.

It has now been discovered that it is possible to obtain the anhydrous sodium cyanide in a state of high purity by controlling the neutralization reaction to produce a reaction solution of specified composition which can be readily evaporated at a temperature where loss from hydrolysis of the cyanide is negligible to produce the anhydrous product directly. Furthermore, the process of the invention is capable of operation on a continuous basis from beginning to end.

It is an object of the invention, therefore, to provide a continuous process for the production of substantially pure sodium cyanide by the neutralization of sodium hydroxide with hydrogen cyanide which is simple, economical, and practical.

Other objects and advantages of the invention will become apparent from the following description of the invention.

Data, hitherto unavailable, concerning the phase relationships in the ternary system sodium hydroxide-sodium cyanide-water have been obtained which make it possible to produce anhydrous sodium cyanide directly by evaporation of a solution containing specified concentrations of the three components. The ternary phase diagram for this system at three temperatures, 25°, 35°, and 55° C., are presented in Figures 1, 2, and 3. These isotherms show effectively the lines of saturation, invariant points, boundary tie lines, and solid phases formed. Compositions represented are in weight per cent.

A study of Figure 1 will reveal that there are two invariant points, B and C, contrary to what might have been predicted based on the knowledge that sodium cyanide forms a dihydrate at 34.7° C. The one invariant point, B, is at 14% sodium cyanide and 46% sodium hydroxide and the other, C, is at 34.2% sodium cyanide and 9.8% sodium hydroxide. Hence it is obvious from this trilinear diagram that pure anhydrous sodium cyanide may be obtained by a process of evaporation at 25° C. from any solution whose composition falls in the area ABC as long as evaporation conditions are controlled to maintain the water content of the solution above that represented by the point B, i. e., above 40%. If evaporation is carried beyond this point, the solid sodium monohydrate will be deposited as well as the sodium cyanide. For example, a solution containing 18% sodium hydroxide, 26% sodium cyanide, and 56% water will, upon evaporation under these conditions, yield the anhydrous salt. However, under the same conditions, a solution containing 5% sodium hydroxide, 35% sodium cyanide and 60% water will yield the dihydrate of sodium cyanide and not the anhydrous product, while a solution containing 12% sodium cyanide, 44% sodium hydroxide, and 44% water will deposit sodium monohydrate upon evaporation. Expressed in other terms, anhydrous sodium cyanide will be deposited from aqueous reaction solutions containing sodium cyanide and sodium hydroxide in which there is from 10–46% sodium hydroxide and in which the ratio of sodium hydroxide to sodium cyanide is maintained within the range from approximately 0.3 to approximately 3.3 upon evaporation at 25° C., provided such conditions of evaporation are maintained that the water content of the solution does not fall below 40%.

Figure 2:
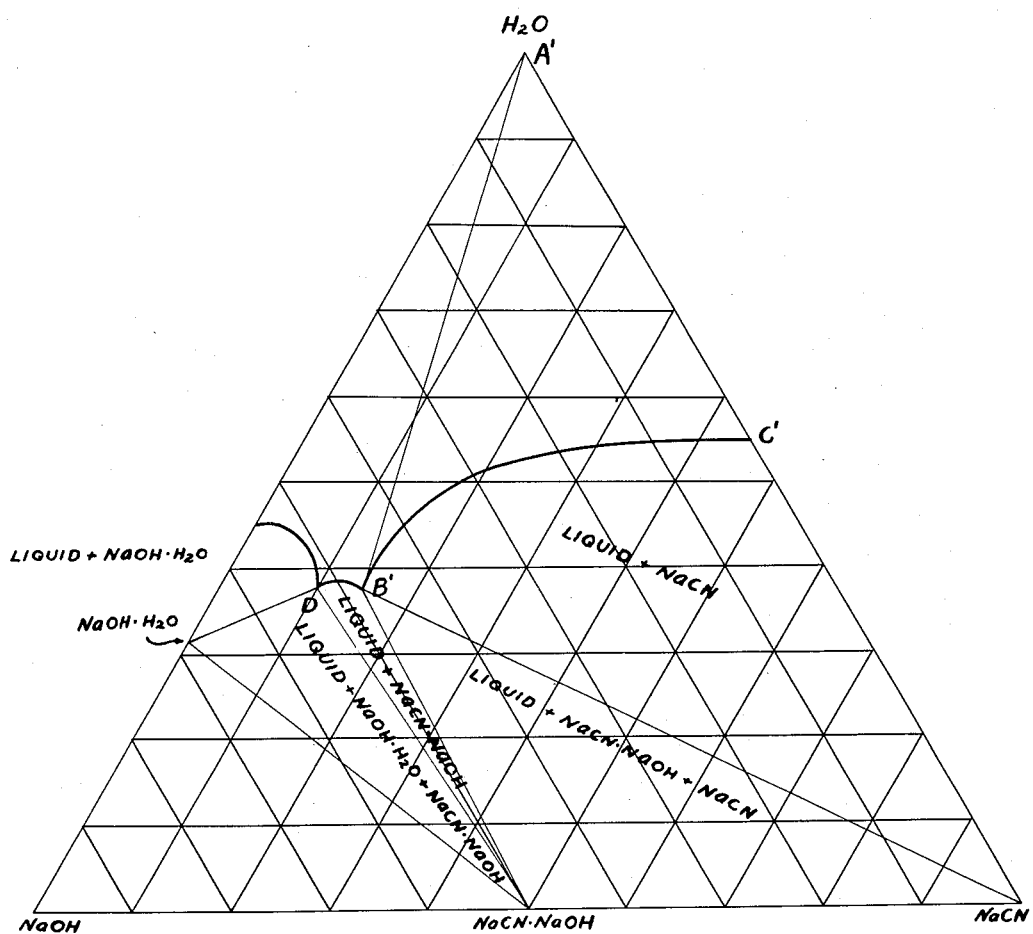
Figure 3:
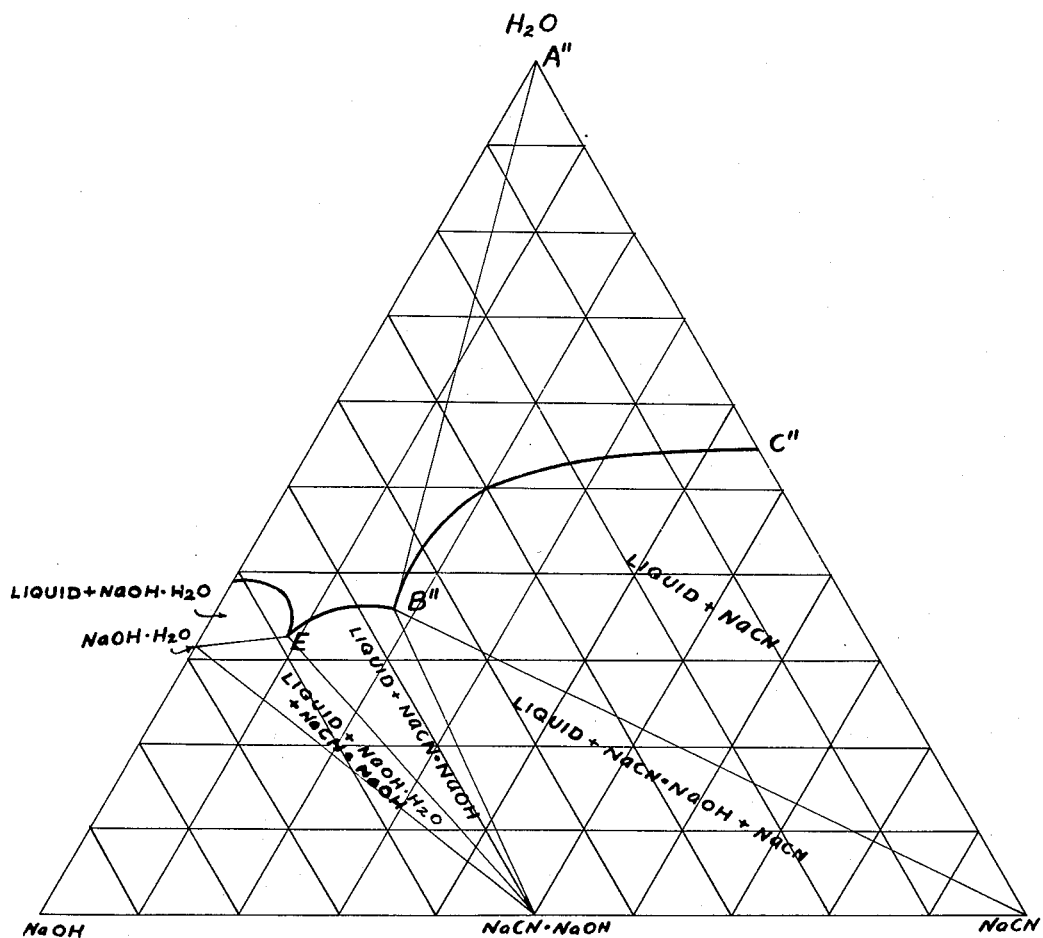

Figure 2 represents the same system at 35° C. A double salt, NaCN·NaOH, having an equimolecular composition of sodium cyanide and sodium hydroxide precipitates as a solid phase and there are necessarily two isothermally invariant points, B' and D, at 10.5% sodium cyanide–51.5% sodium hydroxide and at 15% sodium cyanide–47.5% sodium hydroxide, respectively. Anhydrous sodium cyanide nad sodium monohydrate (NaOH·H₂O) precipitate as the other two solid phases. Pure anhydrous sodium cyanide is precipitated upon evaporation of any solution whose composition falls in the area A'B'C', provided the conditions of evaporation are such that the water content of the solution is maintained above that represented by the point B' on Figure 2, or above 38%. If the water content drops below this point, the double salt will also be deposited as well as the sodium cyanide. For example, pure anhydrous sodium cyanide may be obtained from a solution containing 30% sodium cyanide, 14% sodium hydroxide, and 56% water by evaporation at 35° C., provided that the water content of the solution during evaporation does not fall below 38%. Expressed in other terms, as was done for Figure 1 above, if a ternary solution of sodium cyanide, sodium hydroxide, and water contains less than 47.5% sodium hydroxide and the ratio of sodium hydroxide to sodium cyanide in the solution is approximately 3.2, evaporation of the solution at 35° C. will yield anhydrous sodium cyanide directly if the conditions of evaporation are controlled so as to maintain the water content of the solution above 38%.

In Figure 3, the same system is again represented but at 55° C. Here again there is a double salt having an equimolecular composition of sodium cyanide and sodium hydroxide precipitated in addition to the other solid phases, anhydrous sodium cyanide and sodium monohydrate. The double-salt-forming tendency, it will be observed, is more pronounced at 55° C. than at 35° C. but, as shown in Figure 1, it disappears upon reduction of the temperature to 25° C. There are two isothermally invariant points, B'' and E, at 17% sodium cyanide–47% sodium hydroxide and 9% sodium cyanide–59% sodium hydroxide, respectively. This means that only anhydrous sodium cyanide will be precipitated by evaporation at 55° C., if the composition of the solution to be evaporated falls within the limits represented by the area A″ B″ C″ and if the conditions of evaporation are controlled so as to prevent the water content of the solution from falling below that represented by the point B″ on the phase diagram, or 36%. If evaporation proceeds so rapidly that the concentration of water in the solution drops below 36%, then the double salt NaOH·NaCN will be deposited with the anhydrous NaCN. For example, anhydrous sodium cyanide will be precipitated from a solution containing 16% sodium hydroxide, 30% sodium cyanide, and 54% water upon evaporation at 55° C. as long as the water content of the solution being evaporated remains above 36%. Or, expressed in general terms, if a ternary solution of sodium cyanide, sodium hydroxide, and water contains less than 47% sodium hydroxide and the ratio of sodium hydroxide to sodium cyanide in the solution is approximately 2.8, the solution may be evaporated at 55° C. at a controlled evaporation rate to yield anhydrous sodium cyanide directly.

Figure 4:
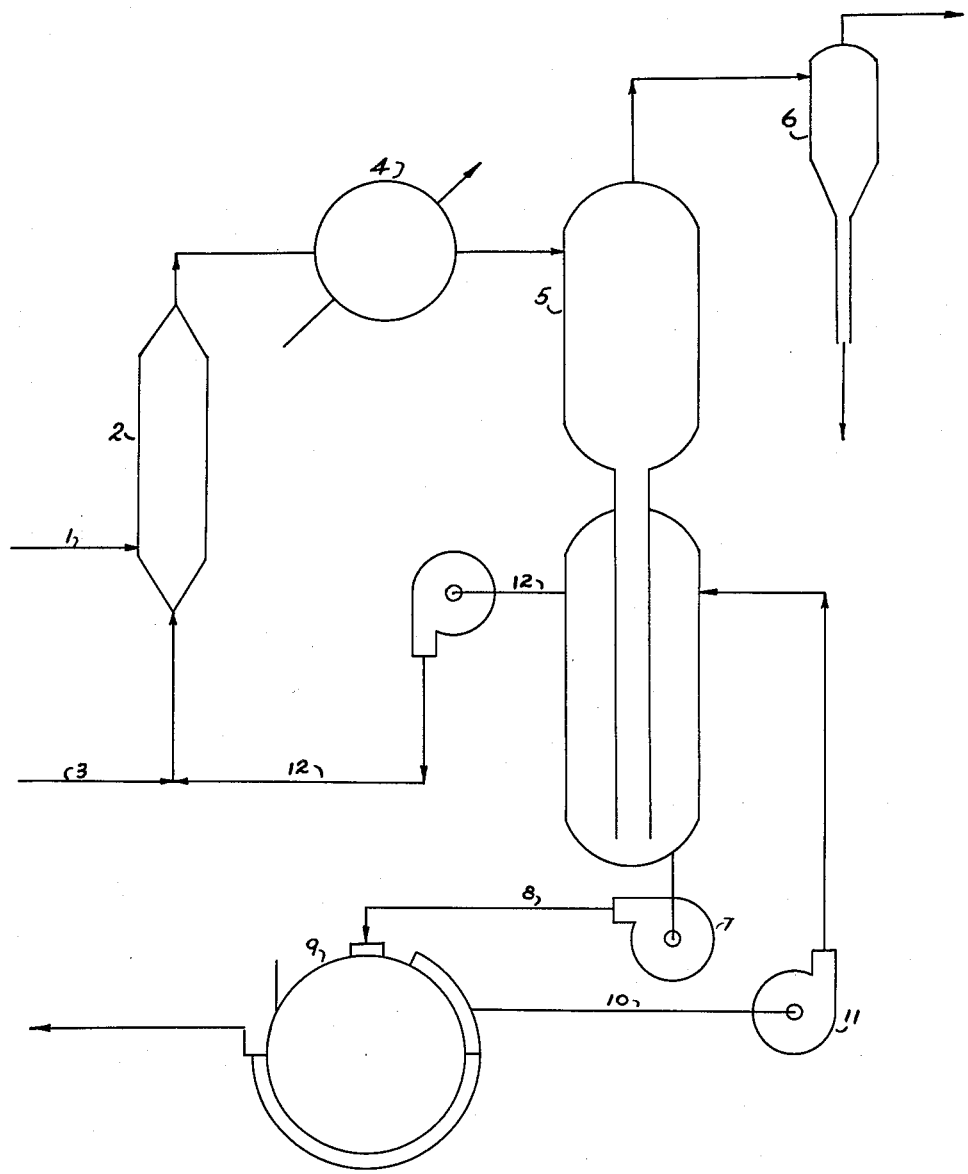

Using the data from the graphs above, it is possible to set up process conditions for producing pure anhydrous sodium cyanide by neutralization of sodium hydroxide with hydrogen cyanide and subsequent evaporation of the reaction solution produced. The following description in conjunction with the drawing of Figure 4 will serve to exemplify the invention and more fully disclose the process thereof.

Substantially pure anhydrous hydrogen cyanide is introduced via line 1 into the reactor 2 at a rate of 275 lb./hour. A 50% solution of sodium hydroxide is admitted to the reactor via line 3 at a rate of approximately 816 lb./hr. Reaction temperature is maintained at approximately 40° C. The reaction solution which is essentially saturated with respect to sodium cyanide and which contains approximately 40.7% sodium cyanide, 4.1% sodium hydroxide, and 55.2% water is passed through the heat exchanger 4 and then into a classifying crystallizer 5 operated at a pressure of 27 mm. Hg absolute and a temperature of 35° C. The vacuum on the crystallizer is preferably maintained by means of the barometric condenser 6 in conjunction with vacuum jets which evaporate about 591 lb. of H₂O per hour.

The crystal magma of pure anhydrous sodium cyanide, containing 10% of solid material which precipitates out in the bottom of the crystallizer is carried via the pump 7 through line 8 to a rotary filter 9 for drying, the solution being returned to the evaporator via line 10 and pump 11 and the solid being dried on the filter. Approximately 500 lb./hr. of 96–98% anhydrous sodium cyanide are thus produced which may then be cast, pelletized, or otherwise processed by conventional means.

Sodium cyanide solution from the evaporator containing approximately 39.5% by weight of sodium cyanide, 5.0% by weight of sodium hydroxide and 55.5% by weight of water is recycled at an approximate rate of 5000 lb. per hour via line 12 to the reactor entering with the fresh sodium hydroxide feed.

The reactor employed for conducting the neutralization reaction is preferably of the gas-liquid contactor type but any type of conventional reactor employed for gas-liquid reactions is suitable and may be employed.

The concentration of the sodium hydroxide solution is not limited to that given in the example but may vary over a rather wide range. It is predetermined mainly by the permissible concentration of sodium hydroxide in the reaction solution which is in turn governed by the temperature which is to be employed for evaporation. The relation between these two process conditions has been discussed above in detail. A large excess of sodium hydroxide is desirable to ensure reaction of all the hydrogen cyanide fed and prevent loss of hydrogen cyanide by polymerization. The recycle of the essentially saturated solution of sodium cyanide to the reactor with the fresh sodium hydroxide feed aids materially in reducing acid- base hydrolysis which tends to break down the sodium cyanide product and cause significant loss of cyanide values.

The neutralization reaction is only slightly exothermic and may be conducted in the temperature range from 20 to 55° C. but preferably is carried out at about 40° C. The lower temperature limit is controlled mainly by the solubility of sodium hydroxide in the sodium cyanide recycle stream.

The temperature in the evaporation step may, of course, vary as has been thoroughly explained from 25–55° C., depending upon the composition of the reaction solution to be evaporated. Although the data given in the graphs are for the specific temperatures, 25, 35, and 55° C., the position of the isothermally invariant points and the flatness of the solubility curves at these temperatures make it possible to predict that at other temperatures in the range given there will be corresponding areas of operation. Loss due to hydrolysis of sodium cyanide is minimized at the lower temperatures but does not become serious up to 55° C. However, above 55° C. such losses become significant, and at temperatures above this yields are decreased.

What is claimed is:

1. In a process for the production of substantially pure anhydrous sodium cyanide via neutralization of sodium hydroxide with hydrogen cyanide gas, the steps which comprise reacting the hydrogen cyanide gas with a sodium hydroxide solution in such proportions that the composition of the resulting reaction solution falls within the limits represented by the area ABC of Figure 1, precipitating sodium cyanide from said solution by evaporation at a temperature of about 25° C. under conditions such that the water content of said solution is maintained above 40%, and recovering the sodium cyanide crystalline product.

2. In a process for the production of substantially pure anhydrous sodium cyanide via neutralization of sodium hydroxide with hydrogen cyanide gas, the steps which comprise reacting the hydrogen cyanide gas with a sodium hydroxide solution in such proportions that the composition of the resulting reaction solution falls within the limits represented by the area A′B′C′ of Figure 2, precipitating sodium cyanide from said solution by evaporation at a temperature of about 35° C. under conditions such that the water content of said solution is maintained above 38%, and recovering the sodium cyanide crystalline product.

3. In a process for the production of substantially pure anhydrous sodium cyanide via neutralization of sodium hydroxide with hydrogen cyanide gas, the steps which comprise reacting the hydrogen cyanide gas with a sodium hydroxide solution in such proportions that the composition of the resulting reaction solution falls within the limits represented by the area A″B″C″ of Figure 3, precipitating sodium cyanide from said solution by evaporation at a temperature of about 55° C. under conditions such that the water content of said solution is maintained above 36%, and recovering the sodium cyanide crystalline product.

4. In a process for the production of substantially pure anhydrous sodium cyanide via neutralization of sodium hydroxide with hydrogen cyanide gas, the steps which comprise reacting hydrogen cyanide gas with a sodium hydroxide solution in such proportions to produce a liquid-phase ternary system of H₂O, NaCN and NaOH, which system upon evaporation at a particular temperature between about 25° C. and about 55° C. yields initially a composition having a liquid and solid phase in which the solid phase consists of NaCN, and precipitating NaCN from said system by evaporation at said particular temperature while maintaining the weight percent of water in said system above an amount in the range of from about 36% to about 40%, below which amount of water a solid phase would exist containing NaCN together with other solid materials precipitated from the system, and recovering the NaCN crystalline product.

References Cited in the file of this patent

UNITED STATES PATENTS 2,121,020    Christman _____ June 21, 1938

FOREIGN PATENTS 540,062    Great Britain _____ Oct. 2, 1941